United States Patent [19]
Cuevas

[11] Patent Number: 5,975,565
[45] Date of Patent: Nov. 2, 1999

[54] VEHICLE OCCUPANT PROTECTION APPARATUS

[75] Inventor: Jess A. Cuevas, Scottsdale, Ariz.

[73] Assignee: TRW Inc., Lyndhurst, Ohio

[21] Appl. No.: 09/085,414

[22] Filed: May 27, 1998

[51] Int. Cl.⁶ ................................................. B60R 21/22
[52] U.S. Cl. ...................... 280/730.1; 280/728.2
[58] Field of Search ........................... 280/730.1, 728.1, 280/730.2, 728.2; 297/363, 364, 378.12

[56] References Cited

U.S. PATENT DOCUMENTS

| | | |
|---|---|---|
| 3,603,535 | 9/1971 | DePolo . |
| 4,290,627 | 9/1981 | Cumming et al. . |
| 4,765,569 | 8/1988 | Higgins . |
| 5,324,071 | 6/1994 | Gotomyo et al. . |
| 5,722,719 | 3/1998 | Glomstad . |
| 5,730,411 | 3/1998 | Pawlowicz et al. . |

*Primary Examiner*—Eric D. Culbreth
*Attorney, Agent, or Firm*—Tarolli, Sundhein, Covell, Tummino & Szabo

[57] ABSTRACT

An apparatus (10) includes a seat frame (20), an inflatable vehicle occupant protection device (18), and a reinforcing assembly (80). The frame (20) has a bottom portion (24) and a back portion (22) which is pivotal relative to the bottom portion (24). The protection device (18) is mounted on the back portion (22) of the frame (20) for rearward deployment from the back portion (22). The reinforcing assembly (80) includes a rigid brace (82) with an upper end portion (86) adjacent to the back portion (22) of the frame (20), a lower end portion (88) adjacent to the bottom portion (24) of the frame (20), and an intermediate portion (90) joining the upper and lower end portions (86) and (88). A fastener structure (92) fixes one portion (22 or 24) of the frame (20) permanently to one end portion (86 or 88) of the brace (82). A locking device (84) interlocks the other portion (24 or 22) of the frame (20) releasably with the other end portion (88 or 86) of the brace (82).

5 Claims, 2 Drawing Sheets

5,975,565

VEHICLE OCCUPANT PROTECTION APPARATUS

FIELD OF THE INVENTION

The present invention relates to an apparatus for protecting an occupant of a vehicle.

BACKGROUND OF THE INVENTION

An inflatable vehicle occupant protection device, such as an air bag, is part of an apparatus which further includes a crash sensor and an inflator. The crash sensor senses vehicle conditions that indicate the occurrence of a crash. When the crash sensor senses a crash-indicating condition of at least a predetermined threshold level, the inflator is actuated. The inflator then emits inflation fluid which inflates the air bag into the vehicle occupant compartment to help protect an occupant of the vehicle.

An air bag and an inflator are typically assembled together as parts of an air bag module which is separate from the crash sensor. The module is installed in a vehicle part adjacent to the vehicle occupant compartment. The module may thus be installed in a vehicle instrument panel, a vehicle steering column, or, as in the present invention, in a vehicle seat.

SUMMARY OF THE INVENTION

In accordance with the present invention, an apparatus comprises a seat frame, an inflatable vehicle occupant protection device, and a reinforcing assembly. The frame has a bottom portion and a back portion which is pivotal relative to the bottom portion. The protection device is mounted on the back portion of the frame for rearward deployment from the back portion of the frame. The reinforcing assembly blocks forward pivotal movement of the back portion of the frame under the influence of vehicle crash forces applied by the protection device.

The reinforcing assembly includes a rigid brace, a fastener structure, and a locking device. An upper end portion of the brace is located adjacent to the back portion of the frame. A lower end portion of the brace is located adjacent to the bottom portion of the frame. An intermediate portion of the brace joins the upper and lower end portions. The fastening structure fixes one portion of the frame permanently to one end portion of the brace. The locking device interlocks the other portion of the frame releasably with the other end portion of the brace.

BRIEF DESCRIPTION OF THE DRAWINGS

The foregoing and other features of the present invention will become apparent to one skilled in the art to which the present invention relates upon reading the following description of the invention with reference to the accompanying drawings, wherein.

DESCRIPTION OF A PREFERRED EMBODIMENT

Figure 1:
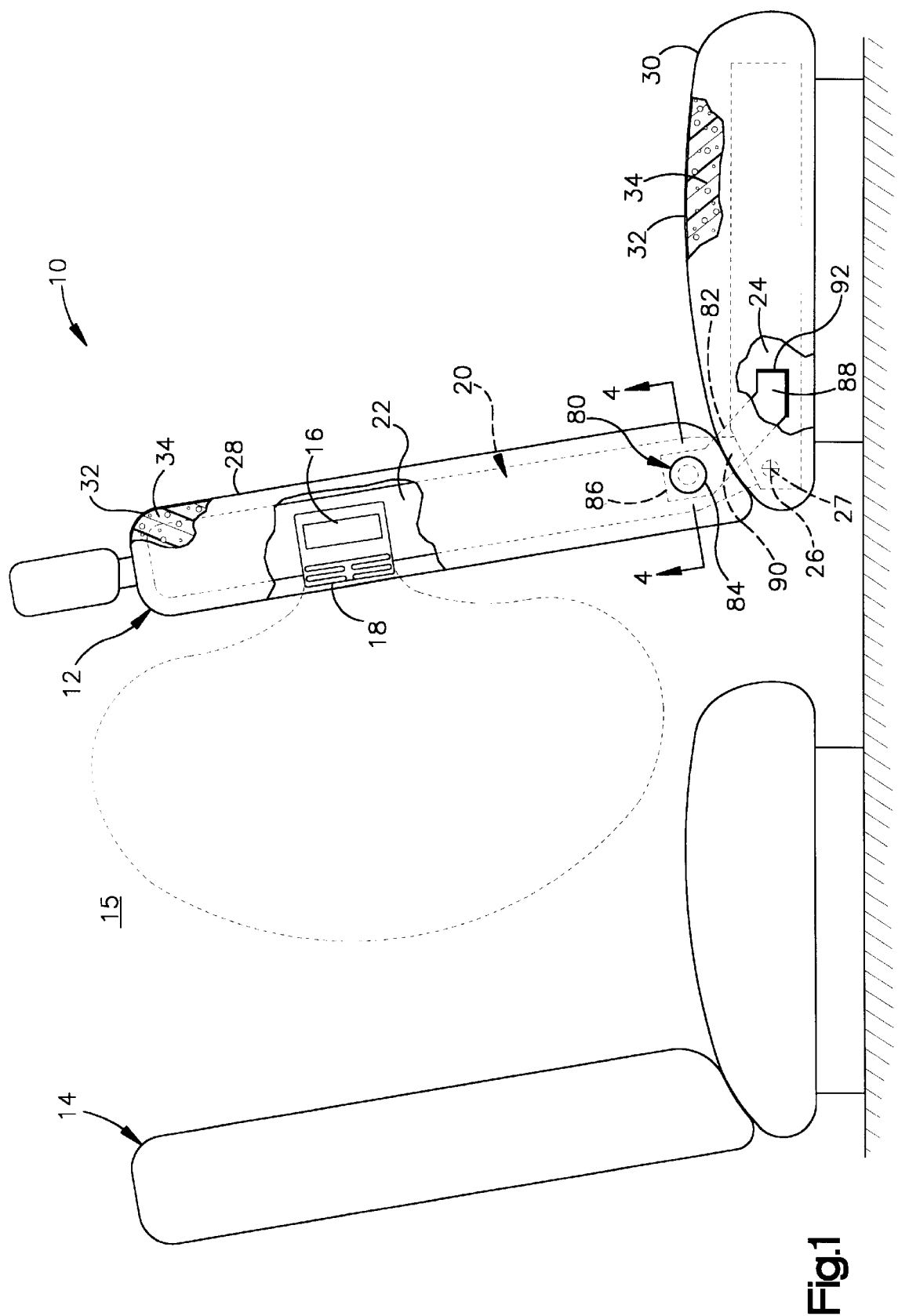
FIG. 1 is a side view of an apparatus comprising a preferred embodiment of the present invention, with certain parts being shown schematically.

An apparatus 10 comprising a preferred embodiment of the present invention is shown partially in FIG. 1. The apparatus 10 includes a front seat 12 and a rear seat 14 in a vehicle occupant compartment 15. The apparatus further includes an inflator 16 and a particular type of inflatable vehicle occupant protection device 18 which is known as an air bag.

The front seat 12 has a frame 20 with a back portion 22 and a bottom portion 24. A bearing 26 (shown schematically) supports the back portion 22 of the frame 20 for movement relative to the bottom portion 24 pivotally about an axis 27. A back cushion 28 covers the back portion 22 of the frame 20, and a bottom cushion 30 covers the bottom portion 24 of the frame 20. Each of the cushions 28 and 30 is a deflectable structure comprising an outer layer 32 on a compressible base 34. The outer layers 32 are preferably formed of fabric or leather. The bases 34 are preferably formed of elastomeric foam. The inflator 16 and the air bag 18 are mounted in the front seat 12 on the back portion 22 of the frame 20, and are covered by the back cushion 28.

The inflator 16 is an elongated cylindrical device comprising a source of inflation fluid for inflating the air bag 18. The inflator 16 may thus contain pressurized inflation fluid, a body of ignitable gas-generating material, or a combination of pressurized inflation fluid and ignitable material for heating the inflation fluid. As shown in greater detail in FIG. 2, the inflator 16 has an initiator assembly 40 at one end and an outlet manifold 42 at the other end. The outlet manifold 42 has a circumferentially extending array of inflation fluid outlet openings 44.

The air bag 18 is constructed of one or more panels of any suitable material known in the art, including woven materials and plastic films. The panels of air bag material are interconnected along seams that are formed by stitches, ultrasonic welds, adhesives, heat staking, or the like, depending on the particular air bag material of which the panels are formed. Preferably, the air bag 18 is constructed of panels formed of a nylon fabric which is coated with silicone. Any suitable arrangement of folds can be used to place the air bag 18 in the folded, uninflated condition in which it is shown schematically in FIG. 1.

Figure 2:
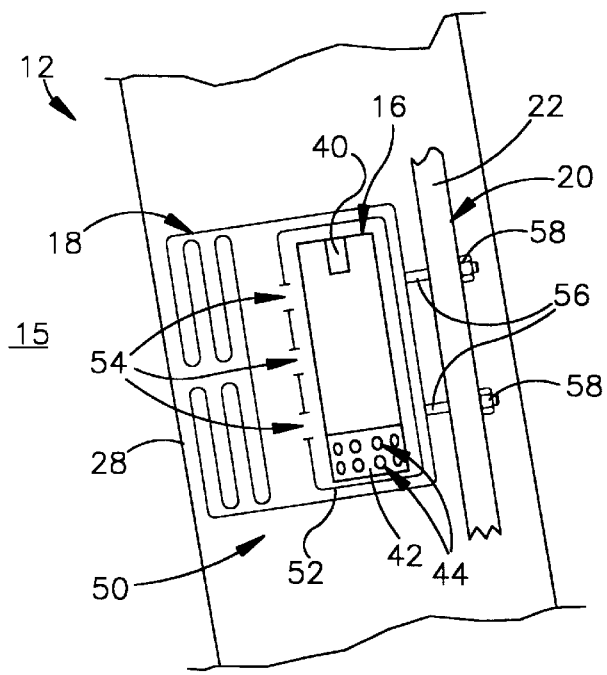
FIG. 2 is an enlarged side view of parts of the apparatus of FIG. 1.

The inflator 16 and the air bag 18 in the preferred embodiment of the present invention are parts of an air bag module 50 which is assembled separately from the seat frame 20. As shown in FIG. 2, the module 50 further includes an elongated tubular diffuser 52 which contains the inflator 16. The inflator 16 and the diffuser 52 are received together within the air bag 18. A plurality of larger outlet openings 54 extend through the diffuser 52, and a pair of mounting studs 56 project from the diffuser 52. Each mounting stud 56 is threaded, and receives a corresponding nut 58 for fastening the module 50 to the back portion 22 of the frame 20.

Figure 3:
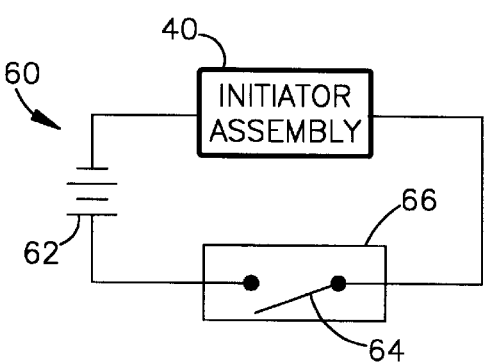
FIG. 3 is a schematic view of an electrical circuit including parts of the apparatus of FIG. 1.

As shown schematically in FIG. 3, the initiator assembly 40 is connected in an electrical circuit 60 with a power source 62 and a normally open switch 64. The power source 62 preferably comprises the vehicle battery and/or a capacitor. The switch 64 is part of a sensor 66 which senses a condition indicating the occurrence of a vehicle crash. If the crash-indicating condition is at or above a predetermined threshold level, the switch 64 closes and electric current is directed through the initiator assembly 40 to actuate the inflator 16 (FIG. 2). Inflation fluid is then emitted from the inflator 16 at the openings 44 in the manifold 42, and flows into the air bag 18 through the openings 54 in the diffuser 52.

As the inflation fluid begins to inflate the air bag 18, it moves the air bag 18 against the back cushion 28 at the rear side of the front seat 12. The force of the inflation fluid pressure acting on the air bag 18 ruptures the back cushion 28. The back cushion 28 may be provided with a tear seam (not shown) of known construction so as to rupture in a predetermined configuration. Additionally, the module 50 may include a cover (not shown) for enclosing the air bag 18 and the other parts of the module 50 inside the back cushion 28. Such a module cover also would be ruptured by the force of the inflation fluid pressure acting on the air bag 18. As the inflation fluid continues to inflate the air bag 18, it moves the air bag 18 outward from the back cushion 28 and into the vehicle occupant compartment 15, as shown in dashed lines in FIG. 1.

When the air bag 18 is inflated in the foregoing manner, it moves into the vehicle occupant compartment 15 behind the front seat 12. The air bag 18 is thus deployed rearwardly from the front seat 12 to help restrain forward movement of an occupant of the rear seat 14. When the air bag 18 restrains forward movement of a vehicle occupant in this manner, it transmits vehicle crash forces from the restrained occupant to the back portion 22 of the frame 20.

A reinforcing assembly 80 is mounted on the frame 20 to block forward pivotal movement of the back portion 22 under the influence of the vehicle crash forces applied by the air bag 18. The reinforcing assembly 80 includes a brace 82 and a locking device 84. In the preferred embodiment of the present invention, the brace 82 is an elongated, flat metal bar with generally distinct portions including an upper end portion 86 and a lower end portion 88. The upper end portion 86 of the brace 82 adjoins the back portion 22 of the frame 20 at a location spaced upward from the bearing 26. The lower end portion 88 of the brace 82 adjoins the bottom portion 24 of the frame 20 at a location spaced forward of the bearing 26. An intermediate portion 90 of the brace 82 joins the upper and lower end portions 86 and 88 separately from the bearing 26 and preferably spans the bearing 26, as shown in FIG. 1.

A fastener structure, such as a weld 92, fixes the lower end portion 88 of the brace 82 permanently to the bottom portion 24 of the frame 20. The locking device 84 normally has an engaged condition interlocking the upper end portion 86 of the brace 82 with the back portion 22 of the frame 20, and is manually releasable from the engaged condition. Accordingly, the locking device 84, the brace 82, and the fastener structure 92 normally interlock the back portion 22 of the frame 20 with the bottom portion 24 to block pivotal movement of the back portion 22 relative to the bottom portion 24 upon the occurrence of a crash. The back portion 22 of the frame 20 can move pivotally relative to the bottom portion 24 when a vehicle occupant disengages the locking device 84.

Figure 4:
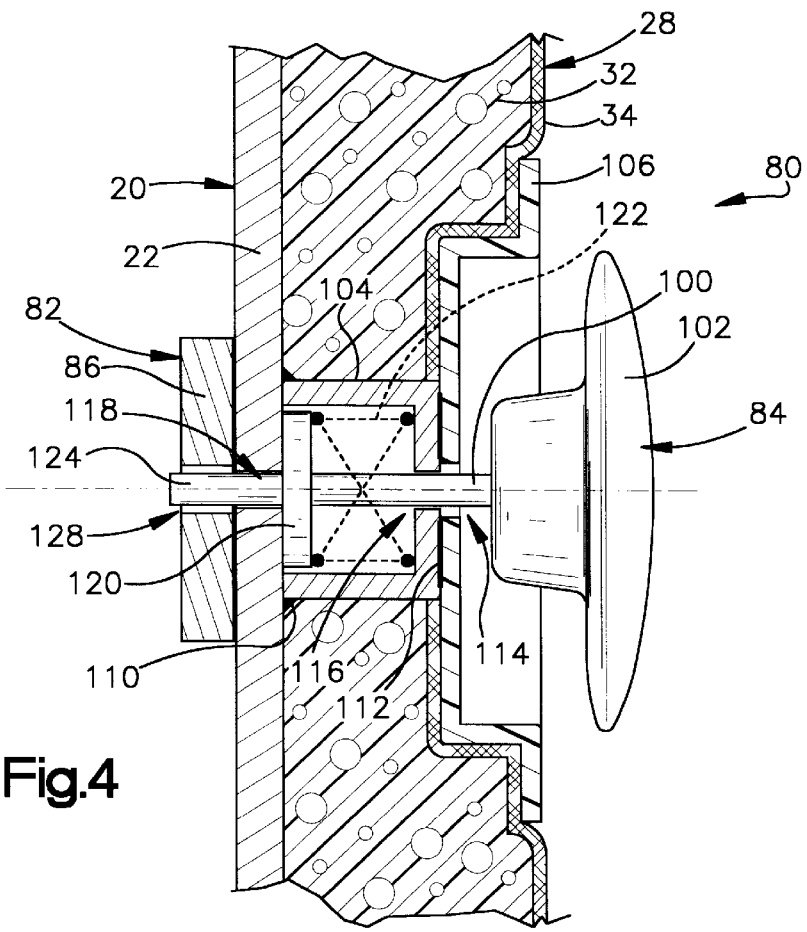
FIG. 4 is an enlarged rear view of parts of the apparatus of FIG. 1.

As shown in greater detail in FIG. 4, the locking device 84 includes a locking pin 100 with a knob 102, and further includes a spring cup 104 and a trim cup 106. The spring cup 104 is mounted on the back portion 22 of the frame 20 by a weld 110. The trim cup 106 is mounted on the spring cup 104 by an adhesive bond 112. The pin 100 extends axially from the knob 102 through a pair of aligned apertures 114 and 116 in the trim cup 106 and the spring cup 104, respectively. The pin 100 further extends through an aligned aperture 118 in the back portion 22 of the frame 20.

A circular flange 120 is fixed to the pin 100, and projects radially outward of the pin 100 at a location within the spring cup 104. The flange 120 is ordinarily held in abutment with the back portion 22 of the frame 20 by a spring 122 in the spring cup 104, as shown in FIG. 4, and is movable axially away from the back portion 22 of the frame 20 against a bias of the spring 122.

When the flange 120 is in the position of FIG. 4, a terminal outer end portion 124 of the pin 100 projects through an aperture 128 in the upper end portion 86 of the brace 82. The pin 100 then blocks movement of the back portion 22 of the frame 20 pivotally about the axis 27 (FIG. 1) relative to the brace 82 and the bottom portion 24 of the frame 20. When a vehicle occupant moves the knob 102 to the right (as viewed in FIG. 4) against a bias of the spring 122, the outer end portion 124 of the pin 100 is withdrawn from the aperture 128 in the upper end portion 86 of the brace 82. The back portion 22 of the frame 20 is then free to move pivotally about the axis 27 relative to the brace 82 and the bottom portion 24 of the frame 20.

From the above description of the invention, those skilled in the art will perceive improvements, changes and modifications. Such improvements, changes and modifications within the skill of the art are intended to be covered by the appended claims.

Having described the invention, the following is claimed:

1. Apparatus comprising:

a seat frame having a bottom portion and a back portion pivotal relative to said bottom portion;

an inflatable vehicle occupant protection device mounted on said back portion of said frame for rearward deployment from said back portion of said frame; and a reinforcing assembly configured to block forward pivotal movement of said back portion of said frame under the influence of vehicle crash forces applied by said protection device, said reinforcing assembly including a rigid brace with an upper end portion adjacent to said back portion of said frame, a lower end portion adjacent to said bottom portion of said frame, and an intermediate portion joining said end portions;

said reinforcing assembly further including a fastener structure which fixes one of said portions of said frame permanently to one of said end portions of said brace, and a locking device which interlocks the other of said portions of said frame releasably with the other of said end portions of said brace.

2. Apparatus as defined in claim 1 wherein said locking device is releasable manually.

3. Apparatus as defined in claim 1 wherein said brace is a flat metal bar.

4. Apparatus as defined in claim 1 wherein said frame includes a bearing supporting said back portion of said frame for movement pivotally relative to said bottom portion of said frame, said upper end portion of said brace being located adjacent to said back portion of said frame at a location spaced upward from said bearing, said lower end portion of said brace being located adjacent to said bottom portion of said frame at location spaced forward of said bearing, said intermediate portion of said brace extending from said upper end portion to said lower end portion separately from said bearing.

5. Apparatus as defined in claim 1 wherein said fastener structure fixes said lower end portion of said brace permanently to said bottom portion of said frame, said locking device interlocking said upper end portion of said brace releasably with said back portion of said frame.

* * * * *